(12) United States Patent
Hughes et al.

(10) Patent No.: US 7,917,547 B2
(45) Date of Patent: Mar. 29, 2011

(54) VIRTUALIZING OBJECTS WITHIN QUERIES

(75) Inventors: Gregory L. Hughes, Redmond, WA (US); Clemens Kerer, Bellevue, WA (US); Brad M. Olenick, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 12/136,616

(22) Filed: Jun. 10, 2008

(65) Prior Publication Data

US 2009/0307192 A1 Dec. 10, 2009

(51) Int. Cl.
*G06F 7/00* (2006.01)
*G06F 17/30* (2006.01)

(52) U.S. Cl. ........................... 707/804; 707/811

(58) Field of Classification Search .................. None
See application file for complete search history.

(56) References Cited

U.S. PATENT DOCUMENTS

| | | | |
|---|---|---|---|
| 5,694,559 A | 12/1997 | Hobson | |
| 5,778,357 A | 7/1998 | Kolton | |
| 5,930,785 A | 7/1999 | Lohman | |
| 5,978,789 A | 11/1999 | Griffin et al. | |
| 5,999,192 A | 12/1999 | Selfridge et al. | |
| 6,009,422 A | 12/1999 | Ciccarelli | |
| 6,032,144 A | 2/2000 | Srivastava | |
| 6,092,062 A | 7/2000 | Lohman | |
| 6,134,545 A | 10/2000 | Sadiq et al. | |
| 6,205,441 B1 | 3/2001 | Al-omari | |
| 6,285,997 B1 | 9/2001 | Carey | |
| 6,341,281 B1 | 1/2002 | NacNicol | |
| 6,360,214 B1 | 3/2002 | Ellis | |
| 6,438,741 B1 | 8/2002 | Al-omari | |
| 6,557,011 B1 | 4/2003 | Sevitsky et al. | |
| 6,618,718 B1 | 9/2003 | Couch | |
| 6,643,640 B1 | 11/2003 | Getchius | |
| 6,678,672 B1 | 1/2004 | Ramasamy | |
| 6,810,429 B1 * | 10/2004 | Walsh et al. | ........... 709/246 |
| 7,437,666 B2 * | 10/2008 | Ramarao et al. | ........... 715/235 |
| 7,472,341 B2 * | 12/2008 | Albornoz et al. | ........... 715/230 |
| 2002/0078094 A1 | 6/2002 | Krishnaprasad | |
| 2002/0123984 A1 | 9/2002 | Prakash | |
| 2003/0144994 A1 | 7/2003 | Wen | |

(Continued)

FOREIGN PATENT DOCUMENTS

WO 2007061430 5/2007

OTHER PUBLICATIONS

Inria, Konstanz U, Passau U, Pisa U, Eth Zrich, "Hybrid Strategies for Query Translation and Optimisation", Oct. 1998, 17 pages.

(Continued)

*Primary Examiner* — Susan Y Chen
(74) *Attorney, Agent, or Firm* — Workman Nydegger

(57) ABSTRACT

The present invention extends to methods, systems, and computer program products for virtualizing objects within queries. Embodiments of the invention virtualize data access for use with queries. Virtualization can be implemented within any portion of a syntax tree. For example, data can be virtualized for a property of an object that is itself another object. Data virtualization facilitates lazy evaluation of query expressions. That is, actual property values for properties within a data construction statement are virtualized until a query specifically requests the actual property values. Further, data virtualization also conserves resources and results in more efficient query evaluations.

20 Claims, 5 Drawing Sheets

U.S. PATENT DOCUMENTS

| | | | |
|---|---|---|---|
| 2003/0212540 A1 | 11/2003 | Meredith | |
| 2004/0215626 A1 | 10/2004 | Colossi | |
| 2004/0254928 A1 | 12/2004 | Vronay | |
| 2005/0004892 A1 | 1/2005 | Brundage | |
| 2005/0010565 A1 | 1/2005 | Cushing | |
| 2005/0015381 A1 | 1/2005 | Clifford | |
| 2005/0033733 A1* | 2/2005 | Shadmon et al. | 707/2 |
| 2005/0097078 A1 | 5/2005 | Lohman et al. | |
| 2005/0102302 A1 | 5/2005 | Marr | |
| 2005/0138073 A1 | 6/2005 | Zhou | |
| 2005/0166140 A1 | 7/2005 | Cai | |
| 2006/0136354 A1 | 6/2006 | Bell et al. | |
| 2006/0155694 A1 | 7/2006 | Chowdhury | |
| 2006/0167865 A1 | 7/2006 | Andrei | |
| 2006/0218123 A1 | 9/2006 | Chowdhuri | |
| 2006/0224556 A1 | 10/2006 | Gupta | |
| 2006/0248078 A1 | 11/2006 | Gross | |
| 2006/0248451 A1 | 11/2006 | Szyperski et al. | |
| 2007/0031109 A1 | 2/2007 | Tsuboi et al. | |
| 2007/0050347 A1* | 3/2007 | Meijer et al. | 707/4 |
| 2007/0050348 A1 | 3/2007 | Aharoni | |
| 2007/0112714 A1 | 5/2007 | Fairweather | |
| 2007/0208721 A1 | 9/2007 | Zaman | |

OTHER PUBLICATIONS

Abiteboul, Serge, et al., "Lazy Query Evaluation for Active XML", Jun. 2004, 12 pages.

Freytag, Johann Christoph, et al, "On the Translation of Relational Queries into Iterative Programs", ACM Transactions on Database Systems, vol. 14, No. 1, Mar. 1989, pp. 1-27.

Beihong Jin, "Translating Object Query Language", http://csd12.computer.org/persagen/DLAbs.jsp?resourcePath=/dl/preceedings/&toc=comp/proceedings/tools/1999/093/00/0393.toc.xml&DOI-12.1109/TOOLS.1999.796509.

Leonidas Fegaras, "Query Optimization Techniques for OODB Languages", http://art.cwru.edu/idm/PIReports/8.html Last Accessed on Aug. 30, 2005.

Nicolas Bruno et al., "Efficient Creation of Statistics over Query Expressions" Proceedings of the 19th International Conference on Data Engineering, Bangalore, India, 2003.

Torsten Grust, "Comprending Queries", In Ausgezeichnete Informatikdissertation 1999 (Distinguished Dissertations in Computer Science), pp. 74-83, B. G. Teubner, Sep. 2000.

Andrew R. Golding And Yves Schabes, Combining Trigram-Based And Feature-Based Methods For Context-Sensitive Spelling Correction, Jun. 1996, p. 71-78.

Ant Je Helfrich, Bradley Music, Project Notes And Demos: Design And Evaluation Of Grammar Checkers In Multiple Languages, Jul. 2000, pp. 1036-1040.

Colin Wilcox, Graham Mayor And Klaus Linke, Microsoft Office Office Word, Word 2002 Help And How To, Section "Add Power To Word Searches With Regular Expression".

U.S. Appl. No. 11/215,089, Oct. 22, 2007, Office Action.
U.S. Appl. No. 11/215,089, Apr. 30, 2008, Office Action.
U.S. Appl. No. 11/215,089, Nov. 13, 2008, Office Action.
U.S. Appl. No. 11/215,089, Apr. 3, 2009, Office Action.
U.S. Appl. No. 11/215,089, Oct. 1, 2009, Office Action.
U.S. Appl. No. 11/215,142, Oct. 16, 2007, Office Action.
U.S. Appl. No. 11/215,142, Apr. 8, 2008, Office Action.
U.S. Appl. No. 11/215,089, Feb. 23, 2010, Notice of Allowance.

* cited by examiner

VIRTUALIZING OBJECTS WITHIN QUERIES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Most, if not all, computing tasks typically include software (e.g., an application or operating system) performing operations on, such as, for example, creating, modifying, deleting, etc., data to obtain a desired result. As such, for software to obtain a desired result, the software must have access to appropriate data. For example, to make edits to a word processing document, a user must locate the word processing document (e.g., within a file system) and enter commands into to the word processor to instruct the word processor to open the word processing document.

If the user is unaware of the documents location, the user can use various search tools to locate the document. The user can enter various search terms into searching module (e.g., file finder). The searching module can search the file system for files that include characteristics identified in the search terms and return the location of any identified files to the user. Thus, to some extent the user submits a query (the search terms) to the searching module, the searching module processes the query (identifying any matches), and to the searching module returns results (any identified matches).

In many environments, more complex data operations are used to create and access data subsets of a larger portion of data. For example within a database system, data creation statements can be used to create views on data in a database. Queries can be issued against views (or other objects) on (or even the entire) database to retrieve desired subsets of data. Based on the arrangement and volume of data in a database, data creation statements and queries can be relatively complex. Further, a series of data creation statements and queries can be used in combination with one another to access data more granularly, resulting in additional complexities.

Additionally, it is often the case that less than all of a set (or subset) of grouped data is requested to perform a desired computed computing operation. For example, a database may contain an address object containing a business address for a number of customers. Each address object may contain street, city, state, and zip code fields. However, to perform a desired operation (e.g., determining number of customers per zip code) only values in the zip code field are relevant. Thus, a query can be issued to obtain a value form the zip code field of each address object.

Unfortunately, in most, if not all, database systems, when a query references a portion of(e.g., a field within) an object, the entire object is instantiated, requiring eager evaluation of the entire object. That is, the entire object is evaluated prior to processing the query that references only a portion of the object. For example, the zip code query would require instantiation of the entire address object prior to processing the zip code query. Instantiating and evaluating data that is not relevant to a query unnecessarily consumes computer system resources and leads to query processing inefficiencies.

Further, as object size increases, unnecessarily consumption of computer system resources and query processing inefficiencies also increases. For example, consider the following object query that describes the creation of an object representing an order:

```
Order order =
    new Order( )
    {
        ItemCount = items.Count( ),
        ShippingAddress =
            new Address( )
            {
                Street = "123 Abc Lane",
                City = "Tukwila",
                State = "WA",
                ZipCode = LookupZipCode(...)
            },
        TotalCost =
            (from it in items
            select item.Price).Sum( )
    }
```

And the query over the object:
  Address address=order.Address

Typical evaluation of this query would require the Order object to first be instantiated, resulting in the eager evaluation of the expressions for the ItemCount, ShippingAddres, and TotalCost properties at that time. Then, the value of the ShippingAddress property would be retrieved from the Order object instance. The creation of the Order object and evaluation of the expression for the ItemCount and TotalCost properties are not used by the second query but computer system resources and time were used in their creation and evaluation anyway.

BRIEF SUMMARY

The present invention extends to methods, systems, and computer program products for virtualizing objects within queries. In some embodiments, an object is created in such a way that portions of the object are accessible without constructing the entire object. A query evaluator receives a data construction statement (e.g., an object query fragment). The data construction statement includes an indication of the type of object that the data construction statement represents the construction of and one or more property identifiers. Each property identifier identifies a property of the object. The data construction statement also includes one or more corresponding mappings. Each corresponding mapping maps a property identifier to a query expression. The query expression indicates how to compute the value for the property of the object identified by the property identifier.

The query evaluator creates a data provider in response to receiving the data construction statement. The data provider virtualizes data access so that properties of the object described by the data construction statement can be accessed without having to evaluate the entire data construction statement or fully construct the entire object. In some embodiments, the data provider includes a reference to the data construction statement. The reference transitively includes references back to the type, property identifiers, and corresponding mappings of the data construction statement.

In other embodiments, a query evaluator responds to a query. The query evaluator receives a property value access query. The property value access query queries for a property value of a property identified in a previously received data construction statement. The query evaluator identifies a data provider created from the previously received data construction statement based on data contained in the property value access query. The data provider virtualizes data access so that properties of an object described by the data construction statement can be accessed without having to evaluate the entire data construction statement or fully construct the entire object.

The query evaluator places the identified data provider in a known location associated with the query evaluator (e.g., a stack used by the query evaluator). The query evaluator creates a data consumer for the property value access query. The data consumer accesses the identified data provider from the known location.

The data consumer requests the property value of the identified property from the data provider. The data consumer receives the property value of the identified property from the data provider. The data consumer places the received property value in the known location for further processing.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
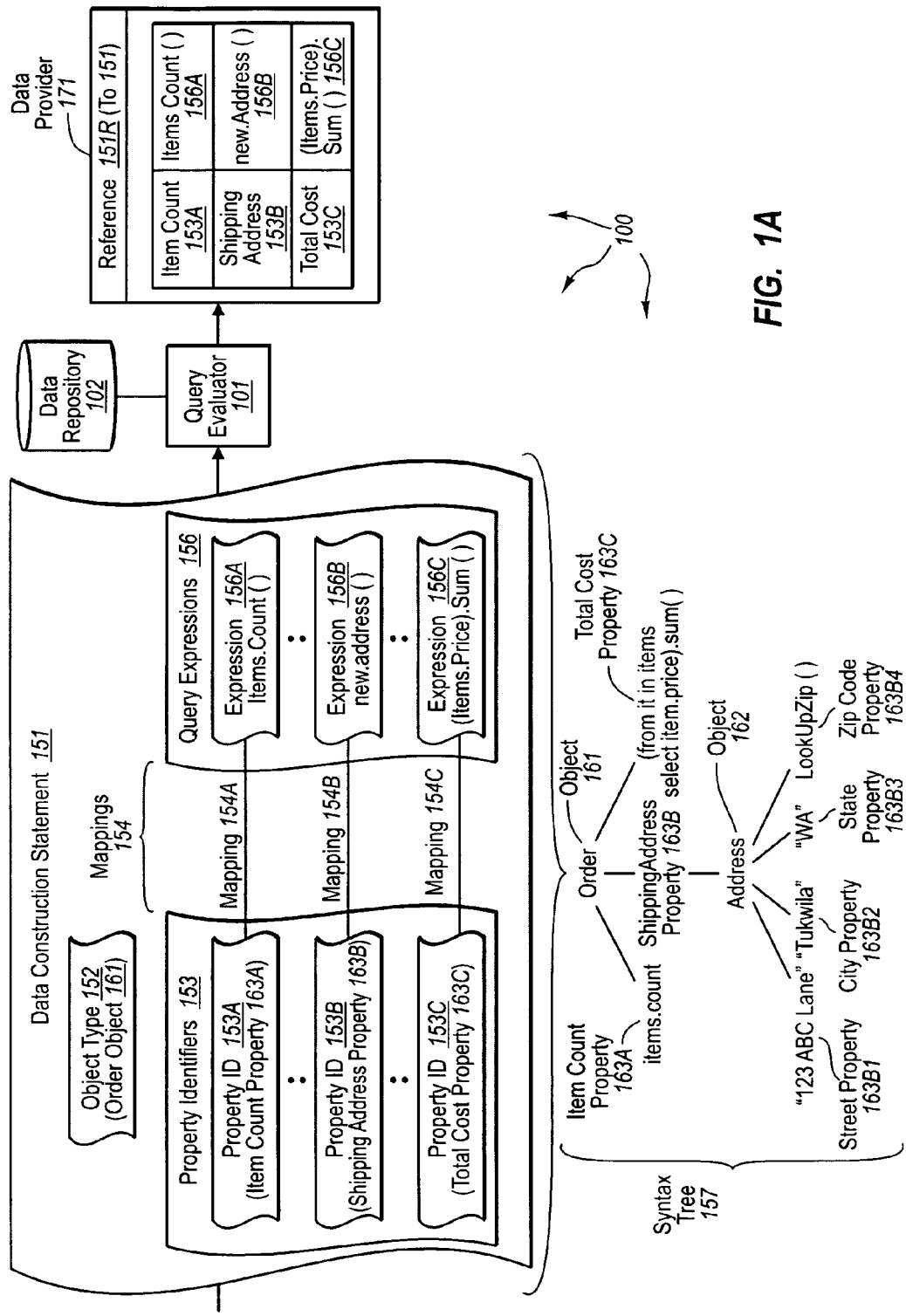
FIG. 1A illustrates an example computer architecture that facilitates creating an object that virtualizes data access.

The present invention extends to methods, systems, and computer program products for virtualizing objects within queries. In some embodiments, an object is created in such a way that portions of the object are accessible without constructing the entire object. A query evaluator receives a data construction statement (e.g., an object query fragment). The data construction statement includes an indication of the type of object that the data construction statement represents the construction of and one or more property identifiers. Each property identifier identifies a property of the object. The data construction statement also includes one or more corresponding mappings. Each corresponding mapping maps a property identifier to a query expression. The query expression indicating how to compute the value for the property of the object identified by the property identifier.

The query evaluator creates a data provider in response to receiving the data construction statement. The data provider virtualizes data access so that properties of the object described by the data construction statement can be accessed without having to evaluate the entire data construction statement or fully construct the entire object. In some embodiments, the data provider includes a reference to the data construction statement. The reference transitively includes references back to the type, property identifiers, and corresponding mappings of the data construction statement.

In other embodiments, a query evaluator responds to a query. The query evaluator receives a property value access query. The property value access query queries for a property value of a property identified in a previously received data construction statement. The query evaluator identifies a data provider created from the previously received data construction statement based on data contained in the property value access query. The data provider virtualizes data access so that properties of an object described by the data construction statement can be accessed without having to evaluate the entire data construction statement or fully construct the entire object.

The query evaluator places the identified data provider in a known location associated with the query evaluator (e.g., a stack used by the query evaluator). The query evaluator creates a data consumer for the property value access query. The data consumer accesses the identified data provider from the known location.

The data consumer requests the property value of the identified property from the data provider. The data consumer receives the property value of the identified property from the data provider. The data consumer places the received property value in the known location for further processing.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1B:
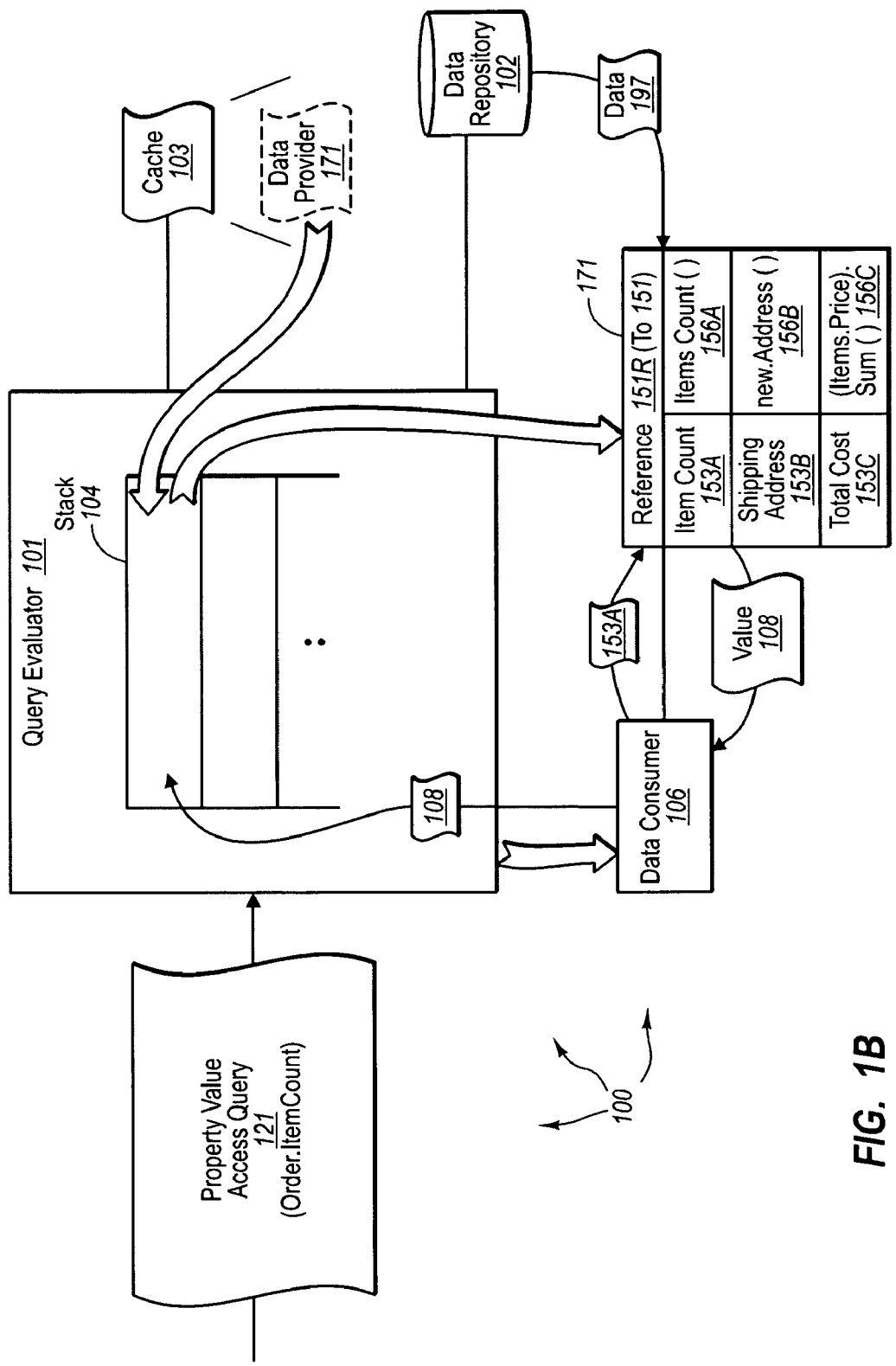
FIG. 1B illustrates the example computer architecture of FIG. 1A including further components that facilitate responding to a query.
Figure 1C:
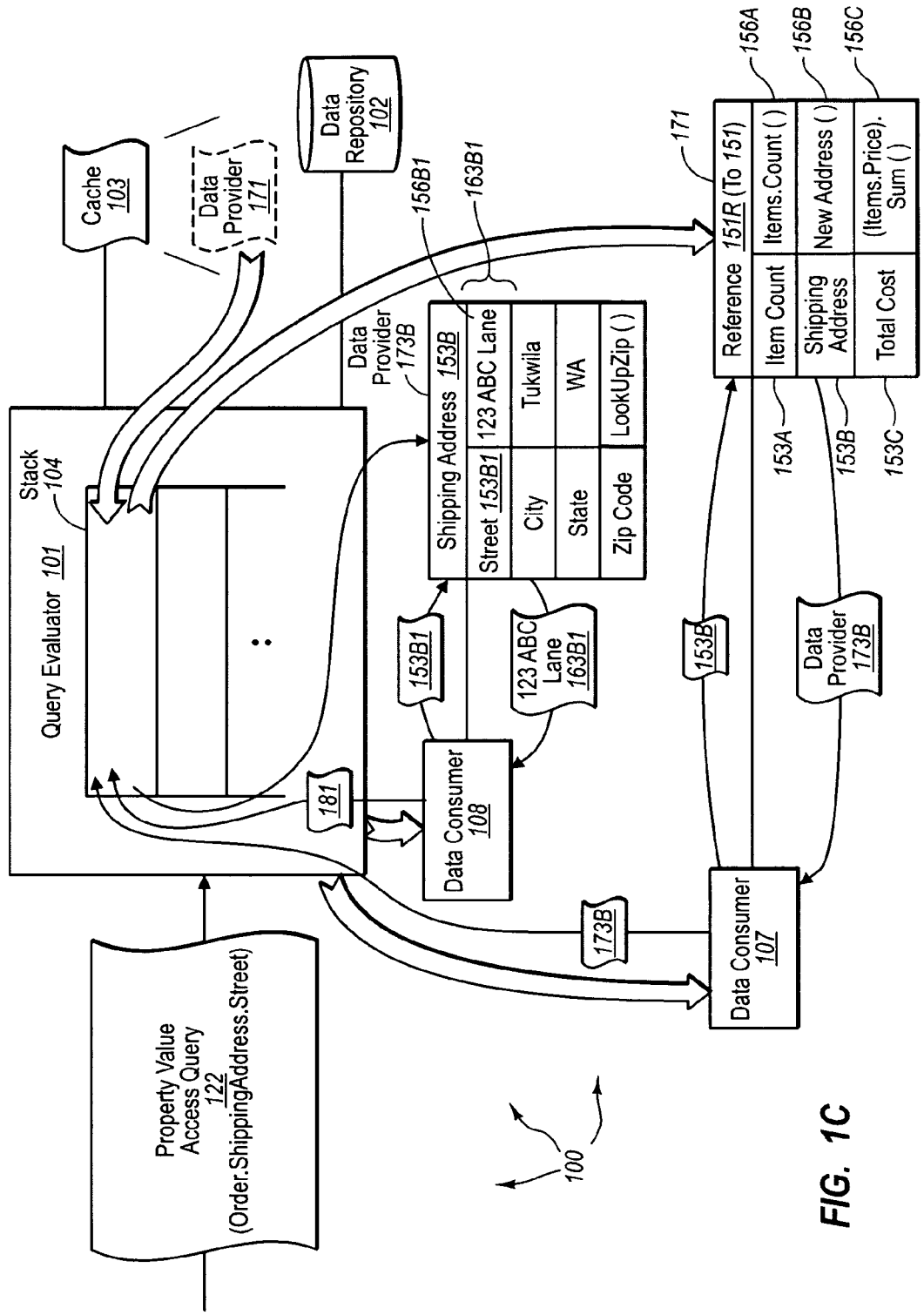
FIG. 1C illustrates the example computer architecture of FIG. 1B including further components that facilitate responding to a query.

FIG. 1A illustrates an example computer architecture 100 that facilitates creating an object that virtualizes data access. FIG. 1B illustrates computer architecture 100 including further components that facilitate responding to a query. FIG. 1C illustrates computer architecture 100 including further components that facilitate responding to a query. Thus, computer architecture 100 includes query evaluator 101, data repository 102, and cache 103. At different times during object creation and/or query evaluation, computer architecture 100 can also include on or more data consumers, such as, for example, data consumers 106 (FIG. 1B), 107 (FIG. 1C) and 108 (FIG. 1C) and one or more data providers, such as, for example, data provider 171 (FIGS. 1A and 1B) and data provider 173B (FIG. 1C).

Each of the depicted components can be connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Embodiments of the invention also generally implement a protocol that includes request/response pairs of messages. The request is sent from a data consumer to a data provider and then a response is returned from the data provider to the data consumer. The request contains an identifier for the property to be accessed and possible other information for the maintenance of secondary protocols between the consumer and provider. The response contains the value of the property that was accessed (which may be another virtualized representation of a data object/protocol provider) and other information for the maintenance of secondary protocols between the provider and consumer.

Referring to FIG. 1, query evaluator 101 is generally configured to execute a set of instructions that have been compiled from an expression. Query evaluator can maintain a set of internal state that may be read and updated by each instruction as it is executed. Generally, an instruction reads results of previous instructions from the current state of query evaluator 101 and writes results back to the current state of query evaluator 101 so that they are available to further instructions.

Whenever the query evaluator 101 encounters an object creation instruction (e.g., new Order( ) { . . . }), it creates a data provider and populates the data provider with information about the type of the object that the data provider is virtualizing (e.g. a list of property identifiers). The data provider is then placed in the current state of the evaluator, making it available for use by further instructions. Whenever query evaluator 101 encounters a property access instruction (e.g. order.ItemCount), it creates a data consumer, passing the identifier of the property to the data consumer along with the provider retrieved from the current state of query evaluator 101. The result of the evaluation of the data consumer is placed into the current state of query evaluator 101 where it can be used by further instructions.

Accordingly, query evaluator 101 is generally configured to receive data construction statements and create data providers from the data construction statements.

In some embodiments, data construction statements represent objects defined in accordance with syntax trees. For example, data construction statement 151 represents order object 161 defined in accordance with syntax tree 157. Generally, a syntax tree (also sometimes referred to as an abstract syntax tree ("AST") is a directed tree where each interior node represents a construct and the children of that node represent meaningful components of the construct. For example, referring to syntax tree 157, the child of ShippingAddress property 163B is an Address construct. Street property 163B1, City property 163B2, State property 163B3, and ZipCode property 163B4 represent meaningful components of the Address construct child of ShippingAddress property 163B.

Syntax tree 157 can represent a query fragment similar to:

```
Order order =
    new Order( )
    {
        ItemCount = items.Count( ),
        ShippingAddress =
            new Address( )
            {
                Street = "123 Abc Lane",
                City = "Tukwila",
                State = "WA",
                ZipCode = LookupZipCode(...)
            },
        TotalCost =
            (from it in items
             select item.Price).Sum( )
    }
```

Accordingly, query evaluator 101 can receive data construction statement 151 and create data provider 171 from data construction statement 151. Data provider 171 virtualizes data access for object 161. Visualizing data access facilitates providing access to properties of object 161 without having to entirely evaluate data construction statement 151 (i.e., obtain actual data values for each property in syntax tree 157). Vitalizing data access also includes providing access to properties of object 161 without having to fully construct object 161.

Data repository 102 represents a database or other data storage location that stores data. Data construction statements can be configured to add data to, provide views on data from, or otherwise modify data stored in data repository 101.

Generally, a data provider is created (e.g., by query evaluator 101) each time a query expression that describes the construction of data is evaluated, such as, for example, Order order=new Order( ) {ItemCount=items.Count( ), . . . }. Each data provider contains information about the type of object it represents. Part of this information is a list of all of the identifiers of the properties contained on the object (e.g. ItemCount). Each data provider also contains an association map between each property identifier in the list and the query expression that will be used to compute the value of the property for that virtualized instance (e.g. items.Count( )). A data provider can also maintain further association maps for the property identifiers (such as a cache of results for each property).

When a request message is received at a data provider, the data provider extracts the property identifier from the message and looks up the corresponding query expression in its association map. The data provider can also retrieve any information from its other association maps for the property (e.g. a previously-cached value for the property). The data provide can also use any additional information contained in the request message (e.g. a time-to-live specification for the cached value).

A data provider can then invoke query evaluator 101 to process the query expression for the property, possibly passing along any secondary information from its internal maps and/or the request message. The result of query evaluation (including any secondary information) is used to update the association maps within the data provider (e.g. caching the result of the query). The result of the query (and any secondary information) is packaged up into a response message. The response message is then sent to the client that initiated the request against the data provider.

Figure 2:
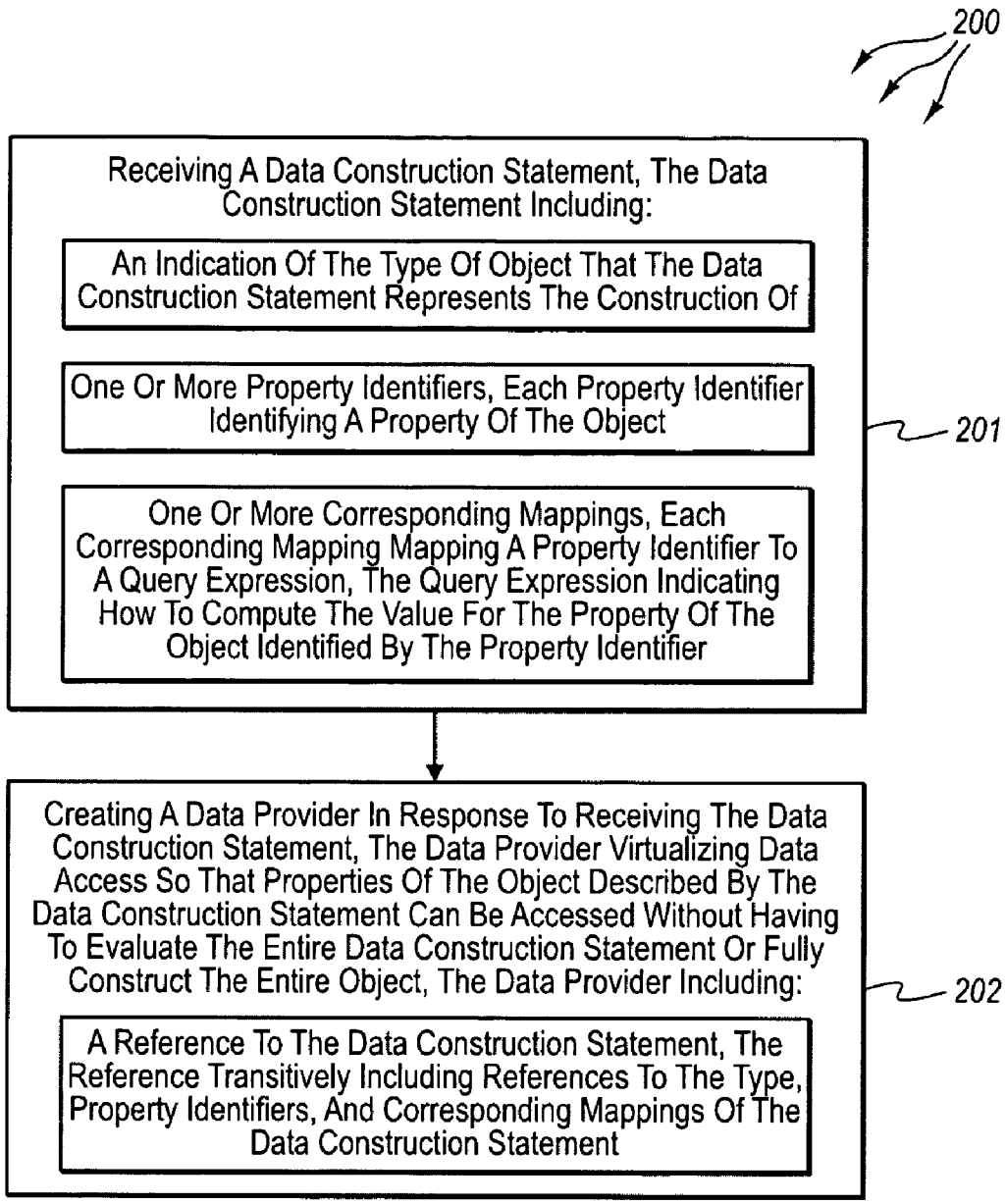
FIG. 2 illustrates a flow chart of an example method for creating an object hat virtualizes data access.

Referring now to FIG. 2, FIG. 2 illustrates a flow chart of an example method 200 for creating an object that virtualizes data access. Method 200 will be described with respect to the components and data of computer architecture 100 depicted in FIG. 1A.

Method 200 includes an act of receiving a data construction statement (act 201). For example, query evaluator 101 can receive data consecutive statement 151. Data construction statement 151 can be received from some other networked computer system in computer architecture 100 (not shown). Alternately, data construction statement 151 can be received as the result of query evaluator 101 evaluating a query expression.

The data construction statement includes an indication of the type of object that the data construction statement represents the construction of For example, data construction statement 151 includes object type 152 indicating that data construction statement 151 represents construction of an order object 161. Data construction statement 151 can define a view on data in data repository 102.

The data construction statement also includes one or more property identifiers. For example, data constructions statement 151 includes property identifies 153. Each property identifier identifying a property of the object. For example, property ID 153A identifies ItemCount property 163A, property ID 153B identifies ShippingAddress property 163B, and property ID 153C identifies TotalCost property 163C.

The data construction statement also includes one or more corresponding mappings. For example, data construction statement 151 includes mappings 154. Each corresponding mapping maps a property identifier to a query expression. For example, mapping 154A maps property ID 153A to query expression 156A, mapping 154B maps property ID 153B to query expression 156B, and mapping 154C maps property ID 153C to query expression 156C. Each query expression indicates how to compute the value for the property of the object identified by the property identifier. For example, query expression 156A indicates how to compute the value for ItemCount property 163A, query expression 156B indicates how to compute the value for ShippingAddress property 163B, and query expression 156C indicates how to compute the value for TotalCost property 163C.

Method 200 includes an act of creating a data provider in response to receiving the data construction statement (act 202). For example, query evaluator 101 can create data provider 171 in response to receiving data construction statement 151. Data provider 171 virtualizing data access so that properties of order object 161 (described by the data construction statement 151) can be accessed without having to entirely evaluate data construction statement 151 or fully construct order object 161.

For example, instead of query evaluator 101 evaluating all the properties of ShippingAddress property 163B, data provider 171 instead indicates how values for those properties (e.g., 163B1, 163B2, 163B3, and 163B4) can be evaluated in the event they are subsequently requested (e.g., evaluating a further data construction statement "new Address( )" in response to a subsequent property value access query). Further, data provider 171 represents partial construction of order object 161. Accordingly, resources are conserved by minimizing potentially unnecessary access to data repository 102 and minimizing potentially unnecessary allocation of memory to store portions of object 161. Minimizing data access and memory allocation also facilitates more efficient query processing.

In some embodiments, a data provider (e.g., an initially created data provider for a top level object) includes a reference to the data construction statement. For example, data provider 171 includes reference 151R to data construction statement 151. The reference transitively includes references to the type, property identifiers, and corresponding mappings of the data construction statement. For example, reference 151R transitively includes references to object type 152 property identifiers 153, and mappings 154.

Referring now to FIG. 1B, FIG. 1B illustrates computer architecture 100 including further components that facilitate responding to a query. Thus generally, query evaluator 101 is also configured to response to queries, such as, for example, property value access queries. In response to a property value access query, query evaluator 101 can identify an appropriate data provider to respond to the property value access query. Query evaluator 101 can place the identified data provider on stack 104.

Query evaluator 101 can create a data consumer to interact with the identified data provider. The data consumer can access the identified data provider from stack 104 and send a property identifier to the identified data provider. The data provider can evaluate the query expression corresponding to the property identifier and return the result to the data consumer. The data consumer can place the result on stack 104. Evaluation of a query expression can include referring to database 102 to access actual data values.

In some embodiments, a previously created data provider is accessed from cache 103.

Figure 3:
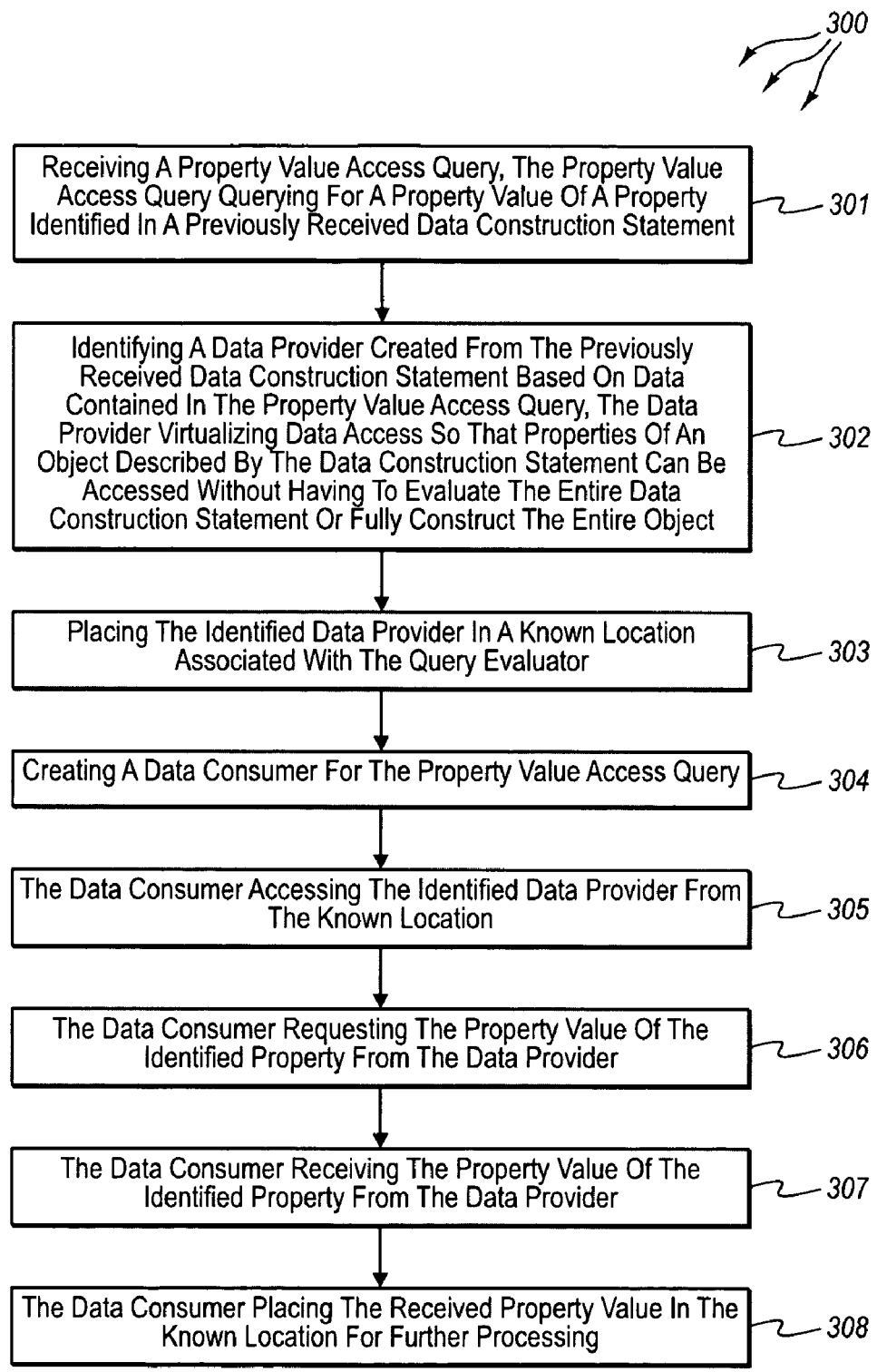
FIG. 3 illustrates a flow of an example method for responding to a query

FIG. 3 illustrates a flow chart of an example method 300 for responding to a query. Method 300 will be described with respect to the components and data of computer architecture 100 depicted in FIG. 1B.

Method 300 includes an act of receiving a property value access query, the property value access query querying for a property value of a property identified in a previously received data construction statement (act 301). For example, query evaluator 101 can receive property value access query 121. Property value access query 121 is a query for a property value of ItemCount property 163A from data construction statement 151. Query evaluator 101 can parse property value access query 121 to determine that the "order" portion of property value access query 121 identifies order object 161 and the "ItemCount" portion of property value access query 121 identifies ItemCount property 163A. Thus, from this information query evaluator 101 can also determine that the property ID 153A corresponds to the property being queried.

Method 300 includes an act of identifying a data provider created from the previously received data construction statement based on data contained in the property value access query (act 302). For example, query evaluator 101 can identify data provider 171 (created from data construction statement 151) based the term "order" included in property value access query 121.

The accessed data provider virtualizes data access so that properties of an object described by the data construction statement can be accessed without having to evaluate the entire data construction statement or fully construct the entire object. For example, as previously described data provider 171 virtualizes data access to the properties of order object 161.

Method 300 includes an act of placing the identified data provider in a known location associated with the query evaluator (act 303). For example, query evaluator 101 can place data provider 171 on stack 104.

Generally, a protocol consumer is evaluated (e.g. by query evaluator 101) each time a query expression that describes an access of a property value is evaluated, such as, for example, order.ItemCount. A protocol consumer is given (e.g., by the query evaluator 101) the identifier of the property that it is to access from a data provider and the instance of the data provider that it is to communicate with.

The data consumer constructs a request message containing the property identifier and possibly any additional out-of-band information available from the query evaluator (e.g., TTL of cached values). The consumer then sends the request to the provider and waits for a response. When a response is received from the data provider, the consumer pulls out the result value of the property and returns it to query evaluator 101, query evaluator 101 can then place the result value on stack 104 for consumption by further queries. The data consumer also updates any additional state/out-of-band information of query evaluator 101 based on the additional information contained within the response message.

Accordingly, method 300 includes an act of creating a data consumer for the property value access query (act 304). For example, query evaluator 101 can create data consumer 106. A created data consumer can be passed the property identifier corresponding to the property for which a property value is being queried. For example, query evaluator 101 can pass property ID 153A to data consumer 106 (or can construct data consumer 106 to include property ID 153A).

Method 300 includes an act of the data consumer accessing the identified data provider from the known location (act 305). For example, data consumer 106 can access data provider 171 from stack 104. Method 300 includes an act of the data consumer requesting the property value of the identified property from the data provider (act 306). For example, data consumer 106 can submit property ID 153A to data provider 171 to request a property value for ItemCount property 163A.

Data provider 171 can match property ID 153A to query expression 156A. Query evaluator 101 can then evaluate query expression 156A to create a value for ItemCount property 163A. For example, query evaluator 101 can refer to data repository 102 and access data 197 to calculate value 108 (e.g., the total number of items in an order). Data provider 171 can return value 108 to data consumer 106.

Method 300 includes an act of the data consumer receiving the property value of the identified property from the data provider (act 307). For example, data consumer 106 can receive value 108 from data provider 171. Method 300 includes an act of the data consumer placing the received property value in the known location for further processing (act 308). For example, data consumer 106 can place value 108 on stack 104 (e.g., replacing data provider 171). Accordingly, a property value for ItemCount property 163A can be obtained without full creation of object 161 and without having to evaluate actual values for properties 163C, 162B1, 162B2, 162B3, and 162B4.

FIG. 1C illustrates computer architecture 300 and includes further components that facilitate responding to a query. Generally, query evaluator 101 is also configured to create further data providers from further data construction statements that are evaluated during the processing of a received property value access query. Referring now to FIG. 1C, in some embodiments, a property ID can map to a query expression that is a further data construction statement. For example, in data provider 171, property ID 153B is mapped to query expression 156B, which is a data construction statement "new Address( )" for creating an address object. Evaluation of the further data construction statement can result in creation of a further data provider. For example, evaluation of query expression 156B can result in creation of data provider 173B.

Thus, properties of objects that are themselves objects can also be virtualized to conserve resources and facilitate efficient query processing. For example, still referring to FIG. 1C, query evaluator can receive property value access query 121. Property value access query 121 is a query for a property value of Street property 163B1 from data construction statement 151. Query evaluator 101 can parse property value access query 121 to determine that the "order" portion of property value access query 121 identifies order object 161, the "ShippingAddress" portion of property value access query 121 identifies ShippingAddress property 163B, and the "Street portion of property value access query 121 identifies Street property 163B1. Thus, from this information query evaluator 101 can also determine that a property ID 153B1 corresponds to the property being queried.

Query evaluator 101 can identify data provider 171 (created from data construction statement 151) based the term "order.ShippingAddress.Street" included in property value access query 121. Query evaluator 101 can place data provider 171 on stack 104.

Query evaluator 101 can create data consumer 107 and provide it with property ID 153B. From property 153B, data consumer 107 is able to request a value for ShippingAddress property 163B. To do this, data consumer 107 can access data provider 171 from stack 104. Data consumer 107 can then submit property ID 153B to data provider 171 to request a property value for ShippingAddress property 163B.

Data provider 171 can match property ID 153B to query expression 156B. Query evaluator 101 can then evaluate query expression 156B. Evaluation of query expression 156B (a further data construction statement) results in creation of data provider 173B. Data provider 173B virtualizes data access to the object representing the Address object 162 that is the value of ShippingAddress property 163B, similar to how Data provider 151 virtualizes data access to order object 161. Data provider 171 can return data provider 173B to data consumer 107. Data consumer 107 can receive data provider 173B and place data provider 173B on stack 104 (e.g., replacing data provider 171).

Query evaluator 101 can create data consumer 108 and passed property ID 153B1. From property 153B1, data consumer 108 is able to request a value for street property 163B1. Data consumer 108 can then access data provider 173B from stack 104. Data consumer 108 can submit property ID 153B1 to data provider 173B to request a property value for Street property 163B1.

Data provider 173B can match property ID 153B1 to query expression 156B1. Query evaluator 101 can then evaluate query expression 156B1. Query expression 156B1 evaluates to the literal data value "123 ABC Lane". Data provider 173B returns literal data value "123 ABC Lane" to data consumer 108. Data consumer 108 can receive literal data value "123 ABC Lane" and place literal data value "123 ABC Lane" on stack 104 (e.g., replacing data provider 173B).

In some embodiments, out-of-band data is transmitted through composed queries. The out-of-band data can be used to establish and maintain internal protocols among queries. For example, time-to-live ("TTL") values can be used to determine how long a data provider is to be cached. For example, a data consumer can include a TTL value, for example, 250 ms, in a request to indicate to a data provider how long it is to be remain cached.

Accordingly, embodiments of the invention virtualize data access for use with queries. Virtualization can be implemented within any portion of a syntax tree. For example, data can be virtualized for a property of an object that is itself another object. Data virtualization facilitates lazy evaluation of query expressions. That is, actual property values for properties within a data construction statement are virtualized until a query specifically requests the actual property values. Further, and as previously described, data virtualization also conserves resources and results in more efficient query evaluations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented within a computer system that includes one or more processors and memory storing instructions which, when executed by the one or more processors implement the method, for creating a data provider that virtualizes data access to an object so that a subset of a plurality of properties of the object are accessible without constructing the entire object, the method comprising:

an act of a computer system that includes one or more processors receiving a data construction statement that describes at least a portion of a syntax tree of an object having a plurality of properties, wherein the value of at least one of the plurality of properties is determinable by execution of a query expression, and wherein the data construction statement includes:

an indication of a type of object that the data construction statement represents a construction of;

one or more property identifiers, wherein each property identifier identifies a property of the object; and one or more mappings, wherein each mapping maps a property identifier to a corresponding query expression, and wherein the corresponding query expression indicates how to compute a value for the property of the object identified by the corresponding property identifier; and an act of the computer system creating a data provider in response to receiving the data construction statement, wherein the data provider virtualizes data access to the object and facilitates lazy evaluation of queries on the object by creating a partial construction of the object based on the data construction statement, wherein the partial construction of the object provides access to values of one or more properties of the object by executing one or more query expressions corresponding to the one or more properties of the object without having to evaluate the entire data construction statement or fully construct the entire object, and wherein the data provider includes:

a reference to the data construction statement, wherein the reference transitively includes references to the type, the property identifiers, and the corresponding mappings of the data construction statement.

2. The method as recited in claim 1, wherein the act of receiving a data construction statement comprises an act of receiving user input submitting the data construction statement for evaluation prior to the submission of any queries against properties of the virtualized object described by the data construction statement.

3. The method as recited in claim 1, wherein the act of receiving a data construction statement comprises an act of receiving the data construction statement from an existing data provider, the data construction statement being contained within a query expression from the property mappings of the existing data provider.

4. The method as recited in claim 1, further comprising:
an act of receiving a request from a data consumer for the value of a property within the data provider;
an act of referring to the corresponding one or more mappings to locate a query expression corresponding to the identified property;
an act of evaluating the query expression to obtain a property value for the property; and
an act of the returning the property value to data consumer.

5. The method as recited in claim 4, wherein the act of evaluating the query expression to obtain a property value for the property comprises an act of evaluating the query expression to obtain the actual property value for the property.

6. The method as recited in claim 5, wherein the act of evaluating the query expression to obtain the actual property value for the property comprises an act of referring to a data repository.

7. The method as recited in claim 6, wherein the act of referring to a data repository comprises an act of referring to the data repository to access data for calculating the actual property value without accessing data for calculating the values of any other properties described by the data construction statement.

8. The method as recited in claim 4, wherein the an act of evaluating the query expression to obtain a property value for the property comprises an act of evaluating the query expression to obtain a further data provider, and wherein the further data provider virtualizes the property value from the data provider.

9. The method as recited in claim 8, wherein the act of evaluating the query expression to obtain a further data provider comprises an act of evaluating a further data construction statement contained in the data provider to create the further data provider.

10. The method as recited in claim 1, further comprising:
an act of receiving a property value access query, the property value access query including a property identifier from the data construction statement;
an act of identifying the initial data provider for responding to the property value access query based on the property identifier;
an act of placing the initial data provider in a known location associated with the query evaluator;
an act of creating a data consumer for the property value access query;
an act of the data consumer accessing the initial data provider from the known location;
an act of the data consumer requesting the property value of the identified property from the initial data provider;
an act of the initial data provider looking up a query expression corresponding to the identified property from the previously received data construction statement;
an act of evaluating the query expression to obtain a property for the property;
an act of the initial data provider returning the obtained property value to the data consumer;
an act of the data consumer receiving the obtained property value; and
an act of the data consumer placing the received property value in the known location for further processing.

11. The method as recited in claim 10, wherein the act of evaluating the query expression to obtain a property value for the property comprises an act of accessing data from a database.

12. The method as recited in claim 10, wherein the act of evaluating the query expression to obtain a property value for the property comprises an act of constructing a further data provider.

13. A method implemented within a computer system that includes a processor and memory storing instructions which, when executed by the processor implement the method for responding to a query using a query evaluator that utilizes a data provider to virtualize data access to an object so that a subset of a plurality of properties of the object are accessible to the query evaluator without constructing the entire object, the method comprising:
an act of a computer system that includes one or more processors receiving a property value access query, wherein the property value access query queries for a property value of a property identified in a previously received data construction statement that describes at least a portion of a syntax tree of an object having a plurality of properties, and wherein the value of at least one of the plurality of properties is determinable by execution of a query expression;
an act of the computer system identifying a data provider created from the previously received data construction statement based on data contained in the property value access query, wherein the data provider virtualizes data access to the object and facilitates lazy evaluation of queries on the object by creating a partial construction of the object based on the data construction statement, wherein the partial construction of the object provides access to values of one or more properties of the object by executing one or more query expressions corresponding to the one or more properties without having to evaluate the entire data construction statement or fully construct the entire object;
an act of the computer system placing the identified data provider in a known location associated with the query evaluator;
an act of the computer system creating a data consumer for the property value access query;
an act of the data consumer accessing the identified data provider from the known location;
an act of the data consumer requesting the property value of the identified property from the data provider;
an act of the data consumer receiving the property value of the identified property from the data provider;
an act of the data consumer placing the received property value in the known location for further processing.

14. The method as recited in claim 13, wherein the act of the data consumer receiving the property value of the identified property from the data provider comprises an act of the data consumer receiving the actual property value of the property from the data provider.

15. The method as recited in claim 13, wherein the act of receiving the actual property value of the property from the data provider comprises an act of receiving the actual property value of the property without having to evaluate query expressions for other properties described by the previously received data construction statement.

16. The method as recited in claim 13, wherein the act of the data consumer receiving the property value of the identified property from the data provider comprises an act of the data consumer receiving a further data provider from the data provider, and wherein the further data provider virtualizes the property value from the data provider.

17. The method as recited in claim 13, wherein the act of the data consumer placing the received property value in the known location for further processing comprises an act of the data consumer placing the actual property value of the property in the known location.

18. The method as recited in claim 13, wherein the act of the data consumer placing the obtained property value in the known location for further processing comprises an act of placing a further data provider in the known location, and wherein the further data provider virtualizes the property value from the data provider.

19. The method as recited in claim 18, further comprising:
   an act of creating a further data consumer for the property value access query;
   an act of the further data consumer accessing the further data provider from the known location;
   an act of the further data consumer requesting the property value of the identified property from the further data provider;
   an act of the data consumer receiving the property value of the identified property from the data further provider;
   an act of the data consumer placing the received property value in the known location for further processing.

20. The method as recited in claim 19, wherein the act of receiving the property value of the property comprises an act of receiving the actual property value of the property without having refer to a data repository to evaluate query expressions for properties described by the previously received data construction statement and without having to evaluate query expressions for other properties described by the further data construction statement.

* * * * *